(12) United States Patent
Gunna et al.

(10) Patent No.: US 7,707,361 B2
(45) Date of Patent: Apr. 27, 2010

(54) DATA CACHE BLOCK ZERO IMPLEMENTATION

(75) Inventors: Ramesh Gunna, San Jose, CA (US); Sudarshan Kadambi, Sunnyvale, CA (US); Peter J. Bannon, Concord, MA (US)

(73) Assignee: Apple Inc., Cupertino, CA (US)

( * ) Notice: Subject to any disclaimer, the term of this patent is extended or adjusted under 35 U.S.C. 154(b) by 1225 days.

(21) Appl. No.: 11/281,840

(22) Filed: Nov. 17, 2005

(65) Prior Publication Data

US 2007/0113020 A1    May 17, 2007

(51) Int. Cl.
*G06F 12/00*    (2006.01)
*G06F 13/00*    (2006.01)

(52) U.S. Cl. .................. 711/141; 711/100; 711/118; 711/144; 711/154

(58) Field of Classification Search .............. 711/118, 711/141, 145, 144, 100, 117, 154
See application file for complete search history.

(56) References Cited

OTHER PUBLICATIONS

"PowerPC 601; RISC Microprocessor User's Manual," 1993, 3 pages.

*Primary Examiner*—Tuan Van Thai
(74) *Attorney, Agent, or Firm*—Lawrence J. Merkel; Meyertons, Hood, Kivlin, Kowert & Goetzel, P.C.

(57) ABSTRACT

In one embodiment, a processor comprises a core configured to execute a data cache block write instruction and an interface unit coupled to the core and to an interconnect on which the processor is configured to communicate. The core is configured to transmit a request to the interface unit in response to the data cache block write instruction. If the request is speculative, the interface unit is configured to issue a first transaction on the interconnect. On the other hand, if the request is non-speculative, the interface unit is configured to issue a second transaction on the interconnect. The second transaction is different from the first transaction. For example, the second transaction may be an invalidate transaction and the first transaction may be a probe transaction. In some embodiments, the processor may be in a system including the interconnect and one or more caching agents.

17 Claims, 5 Drawing Sheets

DATA CACHE BLOCK ZERO IMPLEMENTATION

BACKGROUND

1. Field of the Invention

This invention is related to the field of processors and, more particularly, to a data cache block zero instruction.

2. Description of the Related Art

Processors implement an instruction set architecture (ISA), which defines the instructions that the processor is designed to execute, the operation of the instructions, the operands for the instructions, etc. Software programmers/compilers use the ISA to create programs for execution on the processors.

Many ISA's include a data cache block zero (DCBZ) instruction. The DCBZ instruction stores zeros to all bytes of a cache block corresponding to a memory address generated during execution of the DCBZ. The DCBZ instruction has a variety of uses. For example, when a page is allocated by the operating system for use by a program, a series of DCBZ instructions can be used to zero the page. In this manner, the data previously stored in the page (which may belong to a different program or user) is not available to the program. The DCBZ is often used in block copy (BCOPY) routines (note that block, in the context of a block copy routine, may refer to a block that is larger than a cache block). The BCOPY routine zeroes the target of the copy using DCBZ instructions prior to copying the data to the target.

Since the DCBZ instruction is defined to write zeros to the entire cache block, there is no need to fetch the data that is currently stored in the cache block from memory (e.g. if the DCBZ misses in the data cache). Data bandwidth on the interconnect to the processor can be conserved by not transmitting the data. Typically, the processor transmits an invalidate transaction to invalidate any other copies of the data that may exist in the system, and then the cache block is allocated into the data cache and zeroed in the data cache.

Most processors implement a sequential consistency model for access to memory in a multi-processor system. Formally, a system is sequentially consistent if the result of any execution is the same as if the operations of all the processors were executed in some sequential order, and the order of the operations from a given processor in this sequential order are the same as the order of the operations in the program executed by the given processor. A key component of sequential consistency is that a read of a location that occurs prior to a write to that location in the sequentially consistent order receives the data in that location prior to the write, and that a read of a location that occurs subsequent to the write in the sequentially consistent order receives the data written to the location for a write.

Implementing a DCBZ using the invalidate and allocate (in the cache) scheme described above in a sequentially consistent model requires that the invalidate only be performed when the DCBZ is non-speculative. If the invalidate transaction is performed speculative, it may invalidate the most recent copy of data stored in the cache block (e.g. in another cache in the system). Then, if another read occurs before the DCBZ in the sequentially-consistent order (or global order) but after the speculative invalidate transaction, the most recent data is not available and the zeros from the DCBZ cannot yet be used. Unfortunately, when a series of DCBZ instructions occurs in close proximity in a routine, the requirement that the DCBZ instructions be non-speculative slows the execution of the routine. The latency of transmitting each invalidate transaction and receiving the corresponding response impacts each DCBZ instruction in the series. That is, M DCBZ instructions, each experiencing L clock cycles of latency, require at least M*L clock cycles to execute because of the non-speculative requirement. The latency may be even worse in some cases. For example, if the processor is coupled to a bus that implements retries as part of its protocol, and an invalidate transaction is retried, then all subsequent DCBZ invalidates are typically rescheduled to ensure sequential consistency between the DCBZ instructions.

SUMMARY

In one embodiment, a processor comprises a core configured to execute a data cache block write instruction and an interface unit coupled to the core and to an interconnect on which the processor is configured to communicate. The core is configured to transmit a request to the interface unit in response to the data cache block write instruction. If the request is speculative, the interface unit is configured to issue a first transaction on the interconnect. On the other hand, if the request is non-speculative, the interface unit is configured to issue a second transaction on the interconnect. The second transaction is different from the first transaction. For example, the second transaction may be an invalidate transaction and the first transaction may be a probe transaction. In some embodiments, the processor may be in a system including the interconnect and one or more caching agents.

In another embodiment, a method comprises executing a data cache block write instruction in a processor; issuing a first transaction on an interconnect to which the processor is coupled if the data cache block write instruction is speculative; and issuing a second transaction on the interconnect if the data cache block write instruction is non-speculative, and wherein the second transaction is different from the first transaction.

BRIEF DESCRIPTION OF THE DRAWINGS

The following detailed description makes reference to the accompanying drawings, which are now briefly described.

Figure 1:
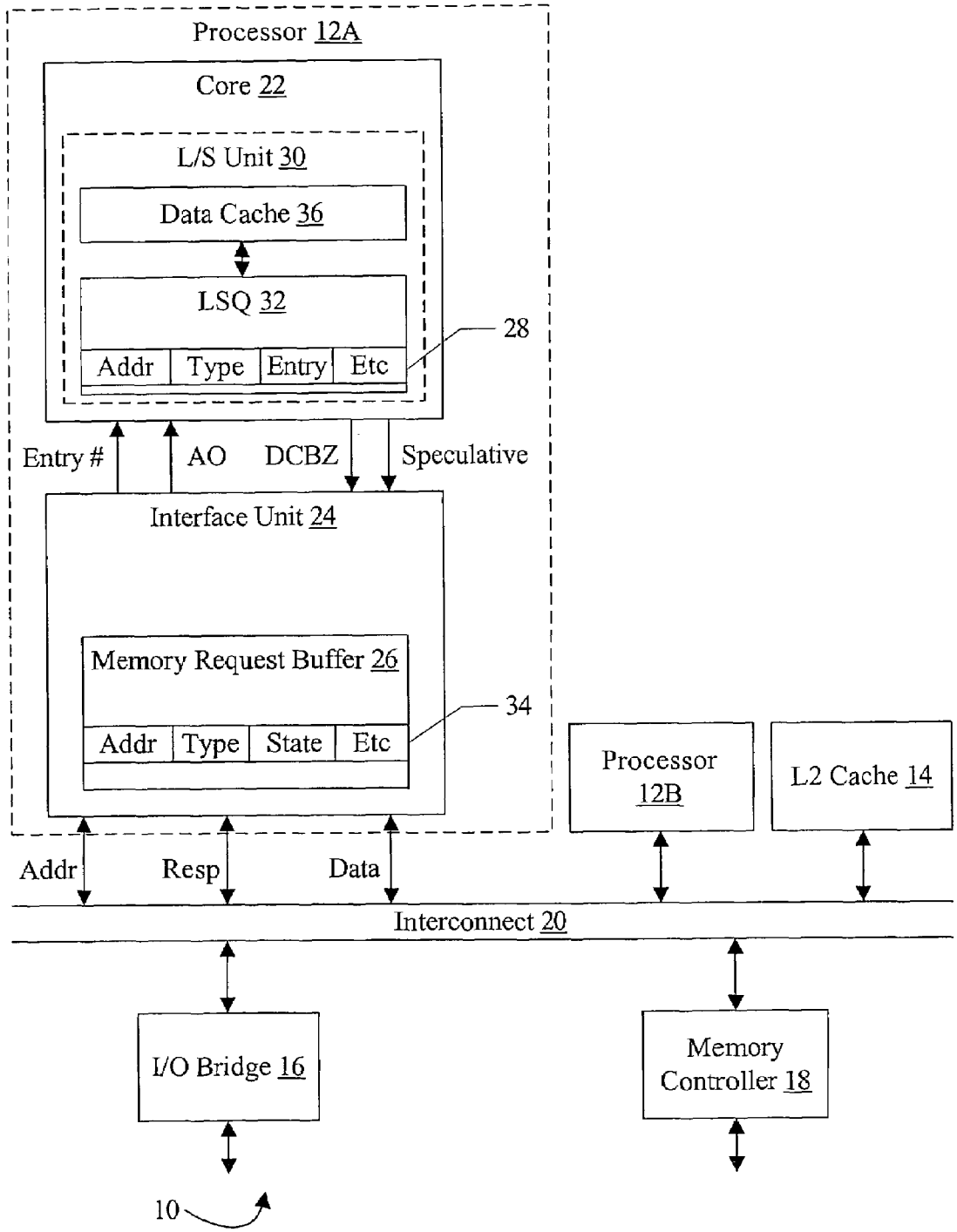
FIG. 1 is a block diagram of one embodiment of a system including a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A processor may implement a data cache block write instruction. Generally, a data cache block write instruction may be any instruction defined to write data to an entire cache block, where a cache block is the unit of allocation of storage space in the cache. The targeted cache block is identified by the address of the block in memory, and may be generated from one or more operands of the data cache block write instruction. The data written may be any desired data, in various embodiments. For example, the DCBZ instruction may be one type of data cache block write instruction that writes zeros to the cache block (as discussed above). The DCBZ instruction is used as an example below, but other embodiments may write any data. For example, all ones could be written. Alternatively, an operand of the instruction may contain the data pattern to be written, and the data pattern may be repeated until the cache block has been filled. In still other embodiments, a predetermined data pattern may be used, or the pattern may be programmed into the processor (e.g. in an implementation dependent register such as the HID registers in the PowerPC ISA or the model specific registers in the x86 ISA).

The processor may issue one of two transactions on the interconnect to which it is coupled, dependent on whether or not the data cache block write instruction is speculative at the time the transaction is issued. If the data cache block write instruction is non-speculative, an invalidate may be issued since it is certain that the data cache block write will be committed. When the invalidate successfully completes, the data cache block write instruction has established itself in the global order and may be completed. On the other hand, if the data cache block write instruction is speculative, a probe may be issued to determine the state of the affected cache block in other caching agents. The processor may record the state reported in the probe response, and may monitor the cache block using the coherency protocol of the interconnect. Subsequently, the speculative data cache block write request may be reissued. If the state of the affected cache block is invalid and the data cache block write instruction is non-speculative, then the processor may complete the data cache block write instruction without issuing any additional transactions on the interconnect. Other embodiments may use other transactions than the invalidate and/or probe transactions.

Generally, an instruction may be speculative if it is not guaranteed to be completed according to the sequential execution of instructions. For example, if a previous instruction in the same code sequence may cause an exception and hasn't yet executed, the instruction may be speculative. If the instruction is subsequent to a predicted branch instruction, the instruction may be speculative since the branch may be mispredicted. In the case of the data cache block write instruction, it may be speculative if one or more previous data cache block write instructions have not completed, since a retry of the transaction corresponding to the previous data cache block write instruction would prevent completion until the previous data cache block write instruction completes. In some embodiments, a DCBZ is indicated as either speculative or not based on whether or not it is the oldest outstanding within the processor. If it is oldest, it is non-speculative. If it is not oldest, it is treated as speculative for these embodiments.

By issuing the probes for speculative data cache block write instructions, the latency of issuing a transaction on the bus and receiving the response may be "hidden" while the instruction is speculative. Once it is non-speculative, the data cache block write instructions may complete rapidly if the states of the affected cache blocks are invalid. In some embodiments, the state of cache blocks that are written with data cache block write instructions may frequently be invalid. For example, a page being newly allocated to a program or being used as the target of a BCOPY may often be out of use by the previous program/user for a relatively long time, and thus may not be cached in the system any longer.

Turning now to FIG. 1, a block diagram of one embodiment of a system 10 is shown. In the illustrated embodiment, the system 10 includes processors 12A-12B, a level 2 (L2) cache 14, an input/output (I/O) bridge 16, a memory controller 18, and an interconnect 20. The processors 12A-12B, the L2 cache 14, the I/O bridge 16, and the memory controller 18 are coupled to the interconnect 20. While the illustrated embodiment includes two processors 12A-12B, other embodiments of the system 10 may include one processor or more than two processors. Similarly, other embodiments may include more than one L2 cache 14, more than one I/O bridge 16, and/or more than one memory controller 18. In one embodiment, the system 10 may be integrated onto a single integrated circuit chip (e.g. a system on a chip configuration). In other embodiments, the system 10 may comprise two or more integrated circuit components coupled together via a circuit board. Any level of integration may be implemented in various embodiments.

The processor 12A is shown in greater detail in FIG. 1. The processor 12B may be similar. In the illustrated embodiment, the processor 12A includes a processor core 22 (more briefly referred to herein as a "core") and an interface unit 24. The interface unit 24 includes a memory request buffer (MRB) 26. The interface unit 24 is coupled to receive a DCBZ request from the core 22 (DCBZ, in FIG. 1) along with an indication of whether or not the corresponding DCBZ is the speculative in the core 22 (Speculative, in FIG. 1), and may also be coupled to provide an entry number and an address-ordered indication (Entry and AO, in FIG. 1) to the core 22. Additional signals may also be provided between the core 22 and the interface unit 24, not shown in FIG. 1. The interface unit 24 is also coupled to communicate address, response, and data phases of transactions on the interconnect 20.

The core 22 generally includes the circuitry that implements instruction processing in the processor 12A, according to the instruction set architecture implemented by the processor 12A. That is, the core 22 may include the circuitry that fetches, decodes, executes, and writes results of the instructions in the instruction set. The core 22 may execute instructions directly, in some embodiments. In other embodiments, the core 22 may execute instruction indirectly. For example, the core 22 may decode each instruction into one or more operations to be executed by the core 22 and/or may microcode instructions. In still other embodiments, the core 22 may implement any combination of direct or indirect execution mechanisms.

The core 22 may include one or more caches. Specifically, the core 22 may include at least one data cache 36 into which the core 22 may allocate a cache block addressed by a DCBZ instruction and into which the core 22 may write zeros for the DCBZ instruction. In one embodiment, the processors 12A-12B implement the PowerPC™ instruction set architecture. However, other embodiments may implement any instruction set architecture (e.g. MIPS™, SPARC™, x86 (also known as Intel Architecture-32, or IA-32), IA-64, ARM™, etc.). In the illustrated embodiment, the core 22 also includes a load/store (L/S) unit 30 including a load/store queue (LSQ) 32.

The interface unit 24 includes the circuitry for interfacing between the core 22 and other components coupled to the interconnect 20, such as the processor 12B, the L2 cache 14, the I/O bridge 16, and the memory controller 18. In the illustrated embodiment, cache coherent communication is supported on the interconnect 20 via the address, response, and data phases of transactions on the interconnect 20. Generally, a transaction is initiated by transmitting the address of the transaction in an address phase, along with a command indicating which transaction is being initiated and various other control information. Cache coherent agents on the interconnect 20 use the response phase to maintain cache coherency. Each coherent agent responds with an indication of the state of the cache block addressed by the address, and may also retry transactions for which a coherent response cannot be determined. Retried transactions are cancelled, and may be reattempted later by the initiating agent. The order of successful (non-retried) address phases on the interconnect 20 may establish the order of transactions for coherency purposes (e.g. according to the sequentially-consistent model). The data for a transaction is transmitted in the data phase. Some transactions may not include a data phase. For example, some transactions may be used solely to establish a change in the coherency state of a cached block. Generally, the coherency state for a cache block may define the permissible operations that the caching agent may perform on the cache block (e.g. reads, writes, etc.). Common coherency state schemes include the modified, exclusive, shared, invalid (MESI) scheme, the MOESI scheme which includes an owned state in addition to the MESI states, and variations on these schemes.

In response to a DCBZ instruction, the core 22 transmits the DCBZ request to the interface unit 24. The DCBZ request may include the address of the cache block affected by the DCBZ and an indication that the request is a DCBZ. That is, the DCBZ request may be communicated over a generalized request interface between the core 22 and the interface unit 24. Additionally, the core 22 may transmit a Speculative indication, indicating whether or not the DCBZ is speculative. The Speculative indication may also be part of the generalized interface.

More particularly, in one embodiment, the core 22 may generate the address of the affected cache block (including translation, if enabled) and may queue a DCBZ request in the LSQ 32 in the load/store unit 30. The load/store unit 30 may be responsible for ordering requests, including DCBZ requests and other load/store requests, and issuing such requests to the data cache 36 and/or the interface unit 24. A first access to the cache may be attempted before the operation is being queued in the LSQ 32.

An entry 28 of the LSQ 32 is shown, illustrating various fields that may be used in one embodiment. The entry 28 includes an address field to store the address, as well as a type field. The type field may identify the request type, which may include DCBZ, load, store, etc. The entry 28 also includes an entry field, which may store the entry number provided by the interface unit 24, described in more detail below. The entry number may be used as a tag for identifying the same operation in the LSQ 32 and the memory request buffer 26. Additional state may be stored in the LSQ 32 as desired (the Etc field shown in the entry 28). The additional state may include the data cache state corresponding to the request, the state of the corresponding instruction (e.g. speculative or non-speculative), whether or not the request has been transmitted to the interface unit 24, whether or not the request has been address-ordered, etc.

The interface unit 24 receives the DCBZ request, and allocates a memory request buffer 26 entry to the request (if an entry has not been previously allocated). The interface unit 24 may supply the entry number identifying the allocated memory request buffer 26 entry to the core 22 (and more particularly to the LSU 30). The interface unit 24 may issue one of the two transactions (invalidate or probe) on the interconnect 20 based on the Speculative indication provided with the request. If the invalidate is issued and the response is not retry, the interface unit 24 may indicate address-ordered (AO) for the DCBZ request. The AO indication indicates that the DCBZ has been address-ordered on the interconnect 20, and thus may be completed by the core 22 (e.g. allocating the cache block into the data cache 36 and writing the zeros into the data cache 36). The AO indication may also be accompanied by the entry number to identify the corresponding DCBZ. Completion of the DCBZ by the core 22 may occur at any time subsequent to the address-ordered indication from the interface unit 24.

In one embodiment, when an AO indication is provided by the interface unit 24, the LSU 30 may reissue the DCBZ requests that are younger then the request that was successfully address-ordered (that is, requests that are subsequent to the address-ordered request in program order). Thus, the younger DCBZ requests may be reattempted until each is able to be address-ordered. In such embodiments, the LSU 30 may not "be aware" that DCBZ requests that are not the oldest cause probes on the interconnect 20. In other embodiments, the LSU 30 may "be aware" of such operation, and may manage the younger requests based on whether or not they previously were address-ordered for their probes.

If the probe is issued for a speculative DCBZ request, the interface unit 24 may track the state of the cache block in other caching agents in the allocated entry. An exemplary entry 34 is shown in FIG. 1. The entry 34 may include address and type fields, similar to the LSQ entry 28 described above. Additionally, the entry 34 may include a state field to track the state of the block in other caching agents. That state field may be initialized based on the probe response to the probe transaction issued by the interface unit 24 for the DCBZ request, and the interface unit 24 may update the state field if any subsequent snoop transactions are detected to the cache block. The state may be represented in any desired fashion. For example, in this embodiment, if any cache has a copy of the block, then the invalidate transaction is issued when the DCBZ request becomes non-speculative. Thus, the state may merely track the presence of the block in another caching agent (e.g. a bit may be set to indicate that a copy exists, and may be clear if no copy exists). Alternatively, the state may fully identify the state according to the coherence scheme implemented in the system 10 (e.g. MESI, MOESI, etc.). Still further, the state may identify which caching agent has a copy (or copies) of the cache block. Additional information may be stored in the entry 34, as indicated by the Etc field shown in FIG. 1.

It is noted that, in other embodiments, the core 22 need not reissue the DCBZ request if the request is initially issued speculatively. The interface unit 24 may be configured to issue the probe transaction, and to subsequently issue the invalidate transaction or indicate completion of the DCBZ request after the DCBZ request is indicated as non-speculative. Furthermore, while the memory request buffer 26 is used to track the state of the affected cache block after a probe transaction for a speculative DCBZ request, other embodiments may track the state separately (e.g. in a state machine).

The interconnect 20 may have any structure. For example, the interconnect 20 may have separate address, response, and data interfaces to permit split transactions on the interconnect 20. The interconnect 20 may support separate address and data arbitration among the agents, permitting data phases of transactions to occur out of order with respect to the corresponding address phases. Other embodiments may have in-order data phases with respect to the corresponding address phase. In one implementation, the address phase may comprise an address packet that includes the address, command, and other control information. The address packet may be transmitted in one bus clock cycle, in one embodiment. In one particular implementation, the address interconnect may include a centralized arbiter/address switch to which each source agent (e.g. processors 12A-12B, L2 cache 14, and I/O bridge 16) may transmit address requests. The arbiter/address switch may arbitrate among the requests and drive the request from the arbitration winner onto the address interconnect. In one implementation, the data interconnect may comprise a limited crossbar in which data bus segments are selectively coupled to drive the data from data source to data sink. In other embodiments, the interconnect 20 may comprise point to point links between agents and packet-based communication may be routed from agent to agent. Responses may be transmitted as response packets (including the probe responses described above). Generally, an agent may be any circuitry that is configured to communicate on the interconnect 20. A caching agent may be any agent that may cache one or more cache blocks. For example, the processors 12A-12B may be caching agents, as may the L2 cache 14. In some embodiments, the I/O bridge 16 may also be a caching agent (e.g. for read-modify-write operations in response to an I/O write to memory).

Generally, a buffer such as the memory request buffer 26 may comprise any memory structure that is logically viewed as a plurality of entries. In the case of the memory request buffer 26, each entry may store the information for one transaction to be performed on the interconnect 20. In some cases, the memory structure may comprise multiple memory arrays. For example, the memory request buffer 26 may include an address buffer configured to store addresses of requests and a separate data buffer configured to store data corresponding to the request, in some embodiments. An entry in the address buffer and an entry in the data buffer may logically comprise an entry in the memory request buffer 26, even though the address and data buffers may be physically read and written separately, at different times. In one implementation, the memory request buffer 26 may be a unified buffer comprising entries that may be used to store addresses of core requests and addresses of snoop requests, as well as corresponding data for the requests.

The L2 cache 14 may be an external level 2 cache, where the data and instruction caches in the core 22, if provided, are level 1 (L1) caches. In one implementation, the L2 cache 14 may be a victim cache for cache blocks evicted from the L1 caches. The L2 cache 14 may have any construction (e.g. direct mapped, set associative, etc.).

The I/O bridge 16 may be a bridge to various I/O devices or interfaces (not shown in FIG. 1). Generally, the I/O bridge 16 may be configured to receive transactions from the I/O devices or interfaces and to generate corresponding transactions on the interconnect 20. Similarly, the I/O bridge 16 may receive transactions on the interconnect 20 that are to be delivered to the I/O devices or interfaces, and may generate corresponding transactions to the I/O device/interface. In some embodiments, the I/O bridge 16 may also include direct memory access (DMA) functionality.

The memory controller 18 may be configured to manage a main memory system (not shown in FIG. 1). The memory in the main memory system may comprise any desired type of memory. For example, various types of dynamic random access memory (DRAM) such as synchronous DRAM (SDRAM), double data rate (DDR) SDRAM, etc. may form the main memory system. The processors 12A-12B may generally fetch instructions from the main memory system, and may operate on data stored in the main memory system. I/O devices may use the main memory system to communicate with the processors 12A-12B (e.g. via DMA operations or individual read/write transactions).

Figure 2:
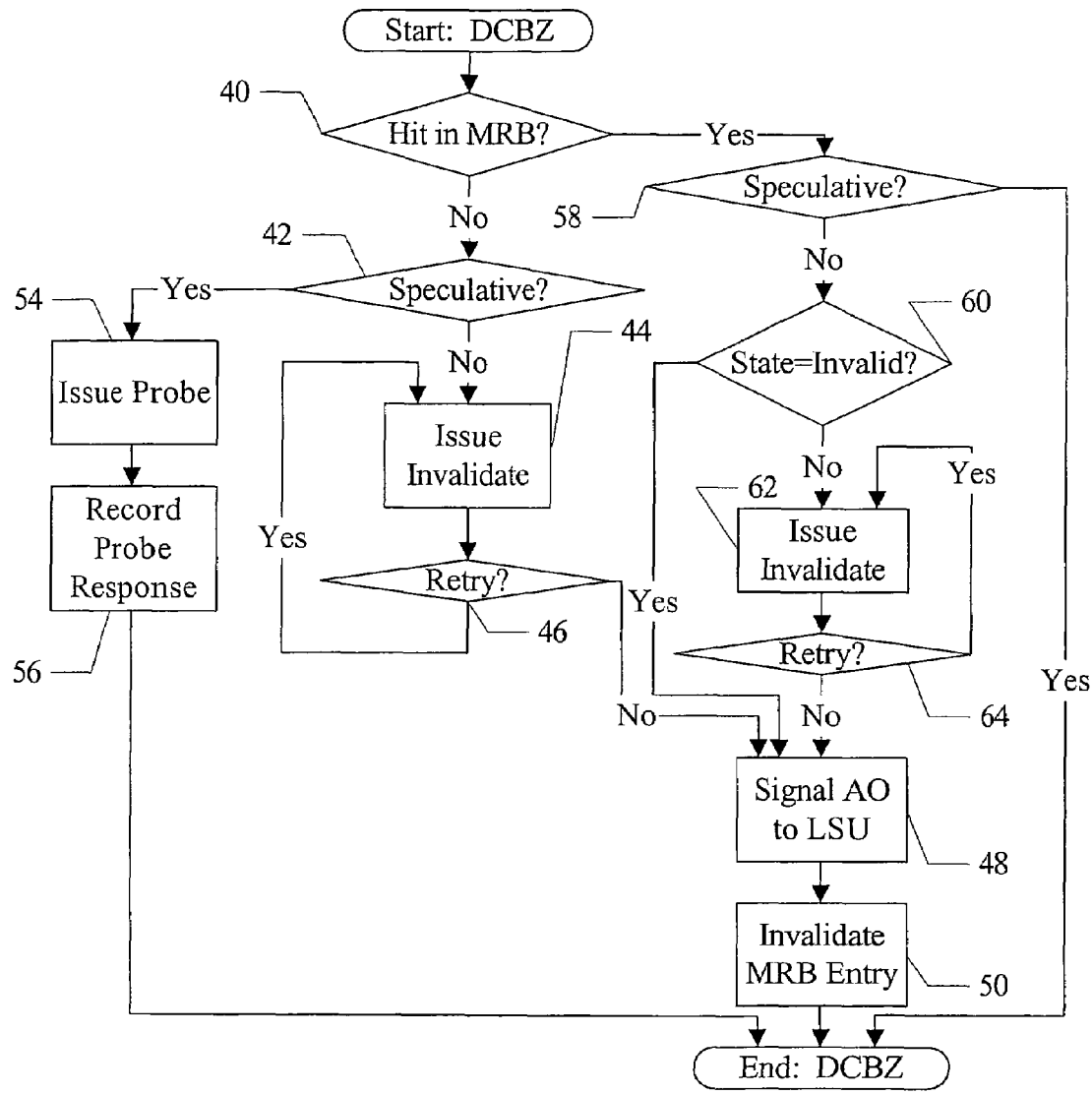
FIG. 2 is a flowchart illustrating operation of one embodiment of a system interface in the processor in response to a data cache block zero operation.

Turning now to FIG. 2, a flowchart is shown illustrating operation of one embodiment of the interface unit 24 in response to a DCBZ request from the core 22. While the blocks are shown in a particular order for ease of understanding in FIG. 2, other orders may be used. Furthermore, blocks may be performed in parallel in combinatorial logic circuitry in the interface unit 24. Blocks, combinations of blocks, and/or the flowchart as a whole may also be pipelined over multiple clock cycles.

The interface unit 24 may compare the address in the DCBZ request to the addresses in the memory request buffer 26, so as to detect if the DCBZ request was previously issued and the interface unit 24 is currently tracking state for the DCBZ request. If the address is a miss in the memory request buffer 26 (decision block 40, "no" leg), then either the DCBZ request has not been previously transmitted to the interface unit 24 or the entry in the memory request buffer 26 that was tracking state for the request was reallocated to another request. If the DCBZ request is indicated as non-speculative (decision block 42, "no" leg), the interface unit 24 may issue an invalidate transaction on the interconnect 20 (block 44). Block 44 may include queuing the invalidate transaction in the memory request buffer 26 and arbitrating for the address portion of the interconnect 20, in some embodiments. The interface unit 24 may await the response phase of the invalidate transaction. If the invalidate transaction is not retried (decision block 46, "no" leg), the interface unit 24 may signal to the core 22 (and more particularly to the LSU 30) that the DCBZ request is address-ordered (block 48). The interface unit 24 may also invalidate the entry (block 50). If the invalidate transaction is retried (decision block 46, "yes" leg), the interface unit 24 may reissue the transaction on the interconnect 20 at a later point (block 44).

If the DCBZ request does not hit in the memory request buffer 26 and is indicated as speculative (decision block 40, "no" leg and decision block 42, "yes" leg), the interface unit 24 may allocate a memory request buffer 26 entry for the DCBZ request and may issue a probe transaction on the interconnect 20 (block 54). When the probe response is received from the interconnect 20, the interface unit 24 may record the state indicated by the probe response in the allocated entry (block 56). In some embodiments, if the probe transaction is retried, the interface unit 24 may reattempt the probe transaction at a later point (similar to the invalidate transaction). In other embodiments, the interface unit 24 may deallocate the memory request buffer 26 entry that was allocated to the probe transaction, if the probe transaction is retried.

If the DCBZ request hits in the memory request buffer 26 (decision block 40, "yes" leg) and the DCBZ request is speculative (decision block 58, "yes" leg), the interface unit 24 may take no action at this time. No other action may be needed, since the interface unit 24 is already tracking state for the DCBZ request and the DCBZ request is still speculative.

If the DCBZ request hits in the memory request buffer 26 (decision block 40, "yes" leg) and the DCBZ request is indicated as non-speculative (decision block 58, "no" leg), operation depends on the state that is recorded for the affected cache block in the memory request buffer 26. If the state indicates that the cache block is invalid in each other caching agent on the interconnect 20 (decision block 60, "yes" leg), the interface unit 24 may signal address-ordered for the DCBZ request without issuing any transactions on the interconnect 20 (block 48) and may invalidate the entry (block 50). If the state indicates that at least one valid copy exists (or may exist) in another caching agent (decision block 60, "no" leg), the interface unit 24 may issue an invalidate transaction on the interconnect 20 (block 62). If the invalidate transaction is retried (decision block 64, "yes" leg), the interface unit 24 may reissue the invalidate transaction at a later time (block 62). If the invalidate transaction is not retried (decision block 64, "no" leg), the interface unit 24 may signal address ordered to the LSU 30 (block 48) and may invalidate the memory request buffer 26 entry (block 50).

Figure 3:
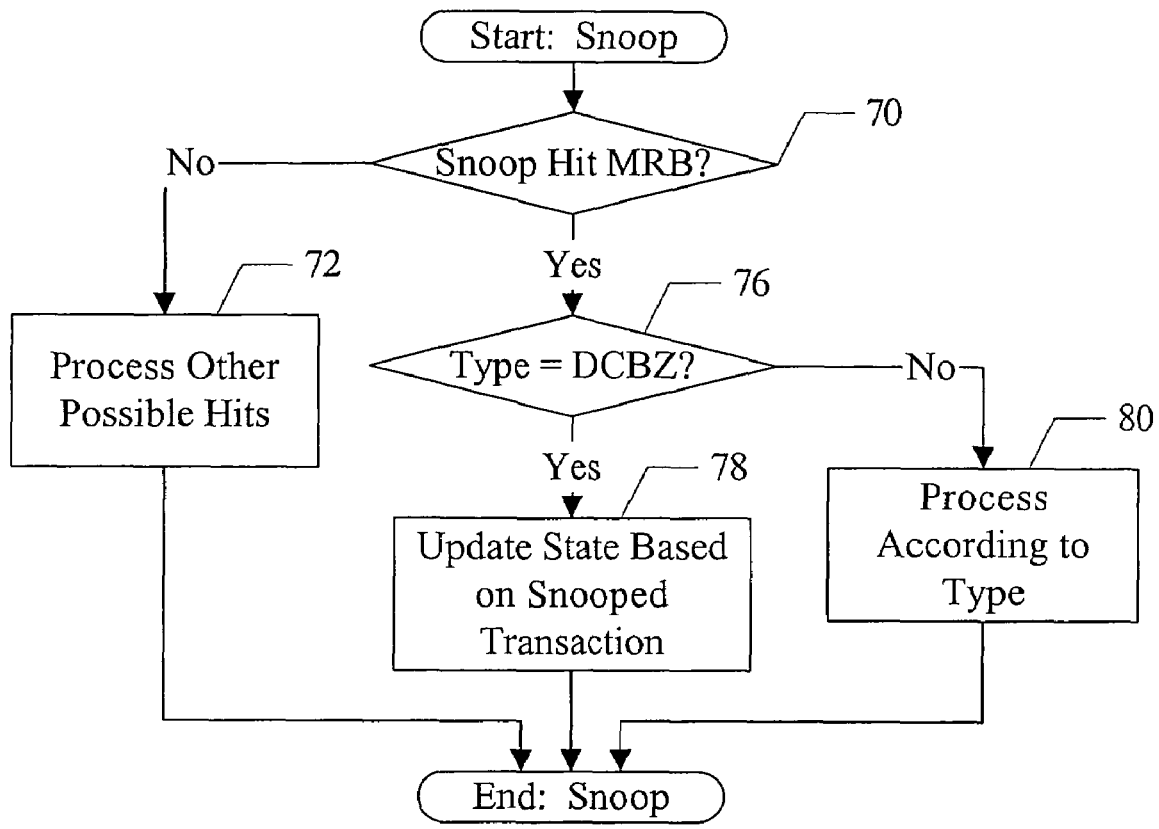
FIG. 3 is a flowchart illustrating operation of one embodiment of a system interface in the processor in response to a snoop.

Turning now to FIG. 3, a flowchart is shown illustrating operation of one embodiment of the interface unit 24 for DCBZ requests in response to snooping a transaction from the interconnect 20. In other embodiments, snooping may not be employed and an explicit probe may be used to maintain coherency. The operation illustrated in FIG. 3 may be used for either such transaction. In general, any coherency protocol may be used on the interconnect 20 and the operation of FIG. 3 may apply to any transaction that may affect the coherent state. While the blocks are shown in a particular order for ease of understanding in FIG. 3, other orders may be used. Furthermore, blocks may be performed in parallel in combinatorial logic circuitry in the interface unit 24. Blocks, combinations of blocks, and/or the flowchart as a whole may also be pipelined over multiple clock cycles.

If the snooped transaction is not a hit in the memory request buffer 26 (decision block 70, "no" leg), then the snoop may be processed normally for other possible snoop hits, such as in the caches (block 72). Such processing may also be performed even if a snoop hit is detected in the memory request buffer 26, in some embodiments. If the snooped transaction is a hit in the memory request buffer 26 (decision block 70, "yes" leg), and the type field in the hit entry indicates a DCBZ request (decision block 76, "yes" leg), the interface unit 24 may update the state tracked in the hit entry based on the snooped transaction (block 78). For example, if the snooped transaction is a read, the interface unit 24 may update the state to indicate that a copy of the block is cached in another caching agent. If the snooped transaction is a hit in the memory request buffer 26 (decision block 70, "yes" leg), and the type field in the hit entry does not indicate a DCBZ request (decision block 76, "no" leg), the snoop hit is processed according to the type of request that is hit (block 80). Various embodiments may perform such processing in any desired fashion.

Figure 4:
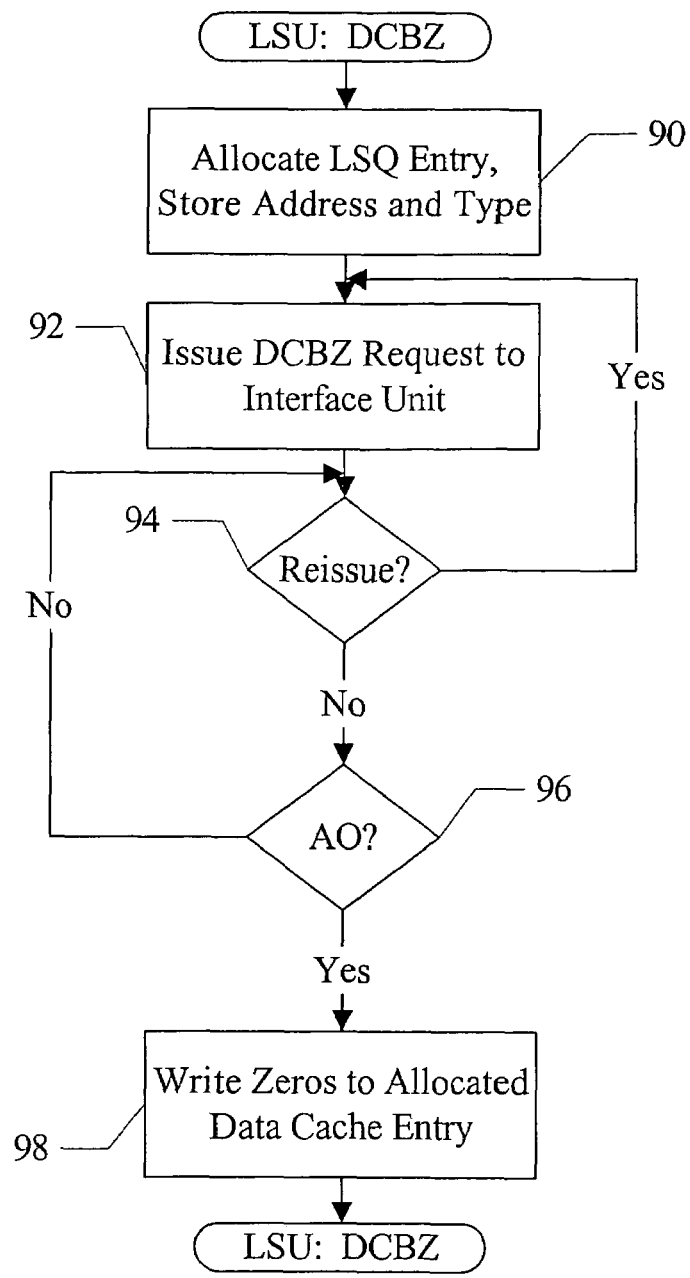
FIG. 4 is a flowchart illustrating operation of one embodiment of a load/store unit in response to a data cache block zero operation.

Turning now to FIG. 4, a flowchart is shown illustrating operation of one embodiment of the load/store unit 30 for a DCBZ instruction executed by the core 22. While the blocks are shown in a particular order for ease of understanding in FIG. 4, other orders may be used. Furthermore, blocks may be performed in parallel in combinatorial logic circuitry in the load/store unit 30. Blocks, combinations of blocks, and/or the flowchart as a whole may also be pipelined over multiple clock cycles.

The LSU 30 may allocate an LSQ 32 entry for the DCBZ operation, and may store the address generated by the core 22 in the entry (and set to the type to indicate DCBZ—block 90). When the DCBZ request is ready to be issued to the interface unit 24, e.g. according to the ordering rules implemented by the LSU 30 for operations in the LSQ 32, the LSU 30 may issue the DCBZ request to the interface unit 24 (block 92). The Speculative indication sent with the DCBZ request is generated based on whether or not the DCBZ is speculative at the time the request is issued. Additionally, the LSU 30 may update the LSQ entry of the DCBZ operation with the entry number returned by the interface unit 24.

The LSU 30 may reissue the DCBZ request if a preceding request is address ordered, as mentioned above. If reissue is signaled (decision block 94, "yes" leg), the LSU 30 may reattempt the DCBZ request at a later time. If address-ordered is signaled for the DCBZ request (decision block 96, "yes" leg), the LSU 30 may complete the DCBZ, writing zeros to the allocated cache block storage location in the data cache (block 98).

Figure 5:
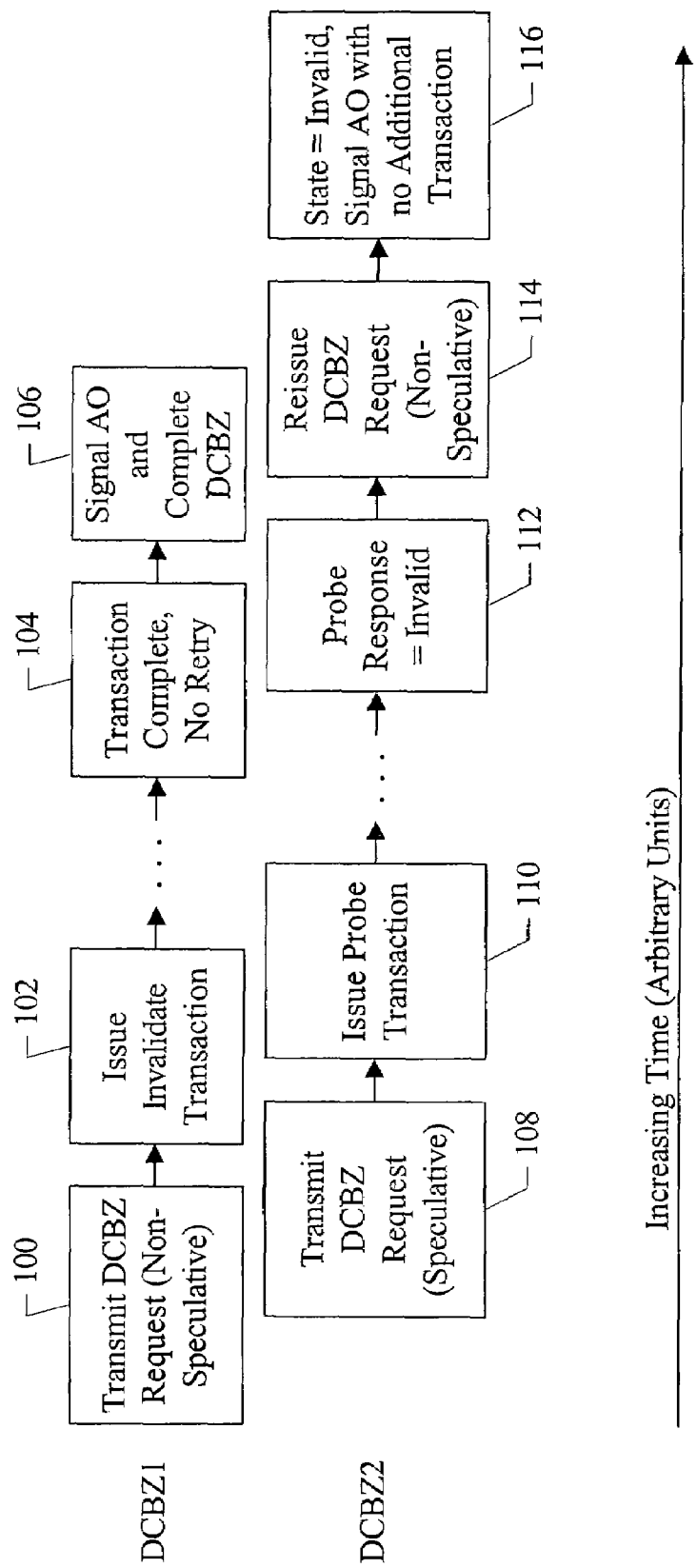
FIG. 5 is a high level timing diagram illustrating operation of a pair of data cache block zero operations for one embodiment.

Turning next to FIG. 5, a high level timing diagram illustrating an example of a pair of DCBZ instructions (DCBZ1 and DCBZ2, where DCBZ1 precedes DCBZ2 in program order) is shown. Events are illustrated as a function of time in FIG. 5, with time progressing in arbitrary units. DCBZ1 is non-speculative at the beginning of the example.

The LSU 30 transmits the DCBZ request for the DCBZ1 instruction, indicating that the request is non-speculative (reference numeral 100). In response, the interface unit 24 issues the invalidate transaction on the interconnect 20 (reference numeral 102). After the latency of transmitting the invalidate transaction has transpired (indicated by the ellipses in FIG. 5) and the response phase occurs, the invalidate transaction completes without retry (reference numeral 104), the interface unit 24 signals address-ordered, and the DCBZ1 is completed (reference numeral 106).

Meanwhile, the DCBZ2 instruction executes and the LSU 30 transmits the DCBZ request speculatively to the interface unit 24 (reference numeral 108). In response, the interface unit 24 issues a probe transaction on the interconnect 20 (reference numeral 110). After the latency of transmitting the probe transaction has transpired (indicated by the ellipses in FIG. 5) and the response phase occurs, the probe response indicates that the cache block is invalid in all other caching agents (reference numeral 112). Subsequently, the LSU 30 reissues the DCBZ request as non-speculative (reference numeral 114). Since the state in the memory request buffer 26 is invalid for the affected cache block, the interface unit 24 signals address-ordered, and the DCBZ2 is completed (reference numeral 116). The latency for performing the probe in this example is successfully hidden, and the DCBZ2 completes rapidly after DCBZ1.

Numerous variations and modifications will become apparent to those skilled in the art once the above disclosure is fully appreciated. It is intended that the following claims be interpreted to embrace all such variations and modifications.

What is claimed is:

1. A processor comprising:
   a core configured to execute a data cache block write instruction; and
   an interface unit coupled to the core and to an interconnect on which the processor is configured to communicate;
   wherein the core is configured to transmit a request to the interface unit in response to the data cache block write instruction, and wherein the interface unit is configured to issue a first transaction on the interconnect if the request is speculative, and wherein the interface unit is configured to issue a second transaction on the interconnect if the request is non-speculative, and wherein the second transaction is different from the first transaction, and wherein the first transaction is a probe, and wherein the interface unit is configured to record a state of a block affected by the data cache block write instruction in one or more caching agents as indicated by a probe response corresponding to the probe.

2. The processor as recited in claim 1 wherein the second transaction is an invalidate.

3. The processor as recited in claim 1 wherein the core is configured to reissue the request if the request is speculative.

4. The processor as recited in claim 3 wherein the interface unit is configured to monitor the address affected by the data cache block write instruction using the recorded state and a coherency protocol on the interconnect.

5. The processor as recited in claim 4 wherein the core is configured to reissue the request, and wherein the interface unit is configured to return an indication of complete for the request without transmitting a transaction on the interconnect if the request is non-speculative and the recorded state indicates that the block is invalid in the one or more caching agents.

6. The processor as recited in claim 1 wherein the interface unit comprises a request buffer, and wherein the interface unit is configured to allocate an entry in the request buffer to track the state, and wherein the interface unit is configured to compare an address of the request to addresses in the buffer to determine if the request has previously been received.

7. The processor as recited in claim 1 wherein the core comprises a load/store unit including a load/store queue, and wherein the load/store unit is configured to allocate an entry in the load/store queue for the data cache block write instruction, and wherein the load/store unit is configured to transmit the request from the entry.

8. The processor as recited in claim 1 wherein the data cache block write instruction comprises a data cache block zero instruction.

9. A system comprising:
an interconnect;
a processor coupled to the interconnect and configured to execute a data cache block write instruction, wherein the processor is configured to issue a first transaction on the interconnect if the data cache block write instruction is speculative, and wherein the processor is configured to issue a second transaction on the interconnect if the data cache block write instruction is non-speculative, and wherein the second transaction is different from the first transaction; and
one or more caching agents coupled to the interconnect; and
wherein the first transaction is a probe, and wherein the processor is configured to record a state of a block affected by the data cache block write instruction in the one or more caching agents as indicated by a probe response corresponding to the probe.

10. The system as recited in claim 9 wherein the second transaction is an invalidate.

11. The system as recited in claim 9 wherein the processor is configured to monitor the address affected by the data cache block write instruction using the recorded state and a coherency protocol on the interconnect.

12. The system as recited in claim 11 wherein the processor is configured to complete the data cache block write instruction without transmitting another transaction on the interconnect if the data cache block write instruction is non-speculative and the recorded state indicates that the block is invalid in the one or more caching agents.

13. The system as recited in claim 9 wherein the one or more caching agents comprise a second processor.

14. The system as recited in claim 9 wherein the one or more caching agents comprise a second level cache.

15. A method comprising:
executing a data cache block write instruction in a processor;
determining whether or not the data cache block write instruction is speculative;
selecting a selected transaction to be issued, the selecting between a probe and a second transaction different from the probe, and the selecting dependent on whether or not the data cache block write instruction is speculative;
issuing the selected transaction on an interconnect to which the processor is coupled; and
recording a state of a block affected by the data cache block write instruction in one or more caching agents as indicated by a probe response corresponding to the probe.

16. The method as recited in claim 15 wherein the second transaction is an invalidate.

17. The method as recited in claim 15 further comprising:
monitoring the address affected by the data cache block write instruction using the recorded state and a coherency protocol on the interconnect; and
completing the data cache block write instruction without transmitting another transaction on the interconnect if the data cache block write instruction is non-speculative and the recorded state indicates that the block is invalid in the one or more caching agents.

* * * * *